Sept. 9, 1952 P. M. ZUMSTEIN 2,609,608
SPINDLE OR ANVIL ATTACHMENT FOR A MICROMETER
Filed Oct. 16, 1948 2 SHEETS—SHEET 1
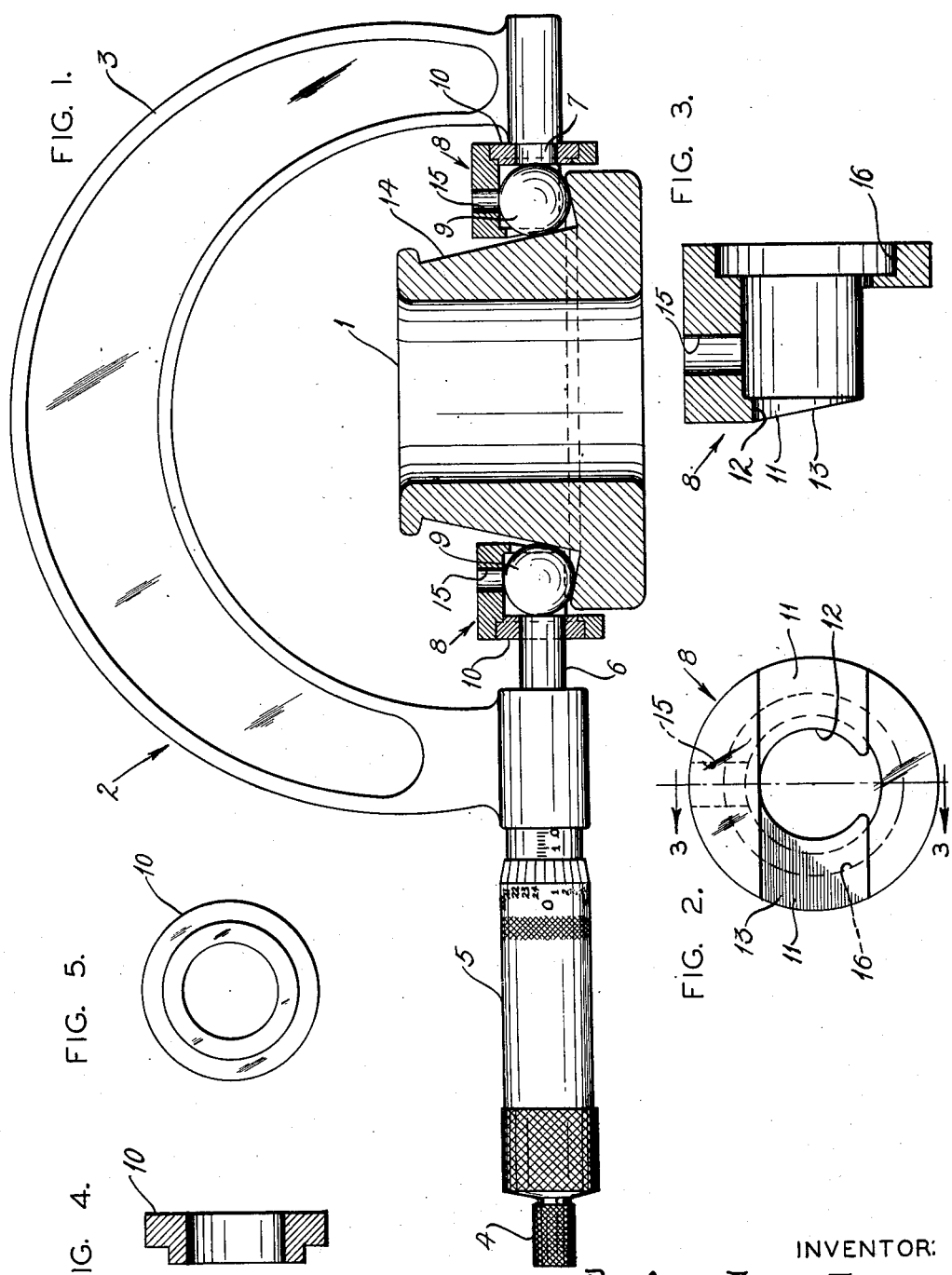
INVENTOR:
Paul M. Zumstein,
by Carr Kerr & Gravely,
HIS ATTORNEYS Sept. 9, 1952        P. M. ZUMSTEIN        2,609,608
SPINDLE OR ANVIL ATTACHMENT FOR A MICROMETER
Filed Oct. 16, 1948        2 SHEETS—SHEET 2

INVENTOR:
Paul M. Zumstein
by Can Van Gravely,
HIS ATTORNEYS.

Patented Sept. 9, 1952

2,609,608

UNITED STATES PATENT OFFICE 2,609,608

SPINDLE OR ANVIL ATTACHMENT FOR A MICROMETER

Paul M. Zumstein, Canton, Ohio, assignor to The Timken Roller Bearing Company, Canton, Ohio, a corporation of Ohio Application October 16, 1948, Serial No. 54,908

9 Claims. (Cl. 33—167)

This invention relates to improvements in attachments or devices used with micrometer gages.

The principal object of the present invention is to provide a means for accurately checking measurements over irregular surfaces, as, for example, measurements near the base diameter, or the rib thickness of a tapered roller bearing cone.

In past practice, balls were positioned in the irregular surface and a micrometer reading was taken over them. This method had the disadvantage of requiring the workman to manipulate many parts in order to obtain an accurate reading.

Another object of the present invention is to provide a single means for accurately determining measurements over irregular surfaces so that a plurality of individual and unattached parts will not be needed.

Figure 6:
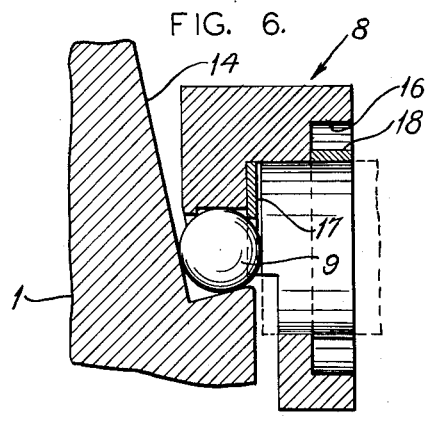
Figure 7:
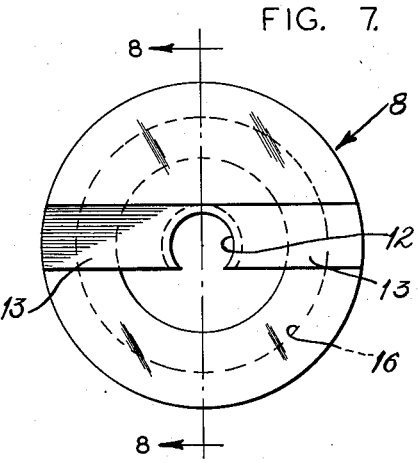
Figure 8:
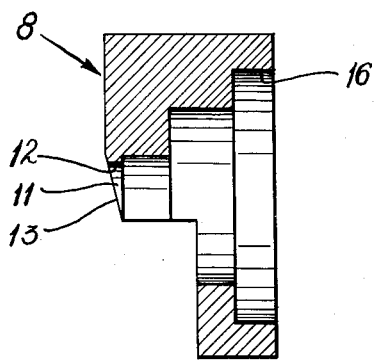
Figure 9:
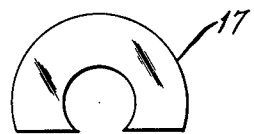
Figure 10:
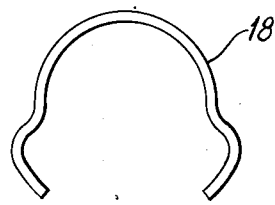
Figure 11:
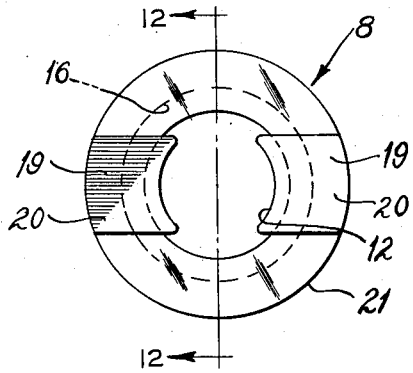
Figure 12:
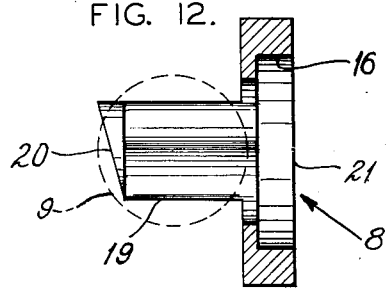

These and other objects and advantages will become apparent as the specification proceeds. Invention consists in this novel construction and combination of parts hereinafter more fully described with the aid of the accompanying drawings, in which:

Fig. 1 is a side elevational view of a micrometer with the attachment shown in a vertical cross-sectional view checking the measurements of a tapered roller bearing cone, Fig. 2 is a front elevational view of the cylindrical piece, Fig. 3 is a vertical cross-sectional view of the cylindrical piece through line 3—3 in Fig. 2, Fig. 4 is a vertical cross-sectional view of the closure washer, Fig. 5 is a side view of the closure washer, Fig. 6 is a vertical cross-sectional view showing a modified construction used when the ball is smaller than the spindle or anvil diameter of the micrometer together with the work, Fig. 7 is a front elevational view of the modified cylindrical piece, Fig. 8 is a cross-sectional view of the modified cylindrical piece through the line 8—8 in Fig. 7, Fig. 9 is a side view of the washer used within the modified cylindrical piece, Fig. 10 is a side view of the spring used within the modified cylindrical piece, Fig. 11 is a front elevational view of this modified cylindrical piece; and Fig. 12 is a vertical cross-sectional view of another modified cylindrical piece through the line 12—12 in Fig. 11.

In Fig. 1 of the accompanying drawings, this invention is shown in proper position for checking the base diameter of tapered bearing cone 1.

The micrometer 2 consists of yoke 3, ratchet knob 4, sleeve 5 with graduated scale, spindle 6, and anvil 7. To this is added the attachment of the present invention comprising socket 8 bored to receive balls 9 and washers 10. The socket 8 shown in Figs. 2 and 3 is a hollow piece that has been bored to receive a ball of the required size and has connected holding arms 11 with an opening 12 to permit the ball 9 to project through to contact the work 1 and at the same time to prevent the ball 9 from falling out. The arm face 13 is sloped to make certain that the tapering race surface 14 of the cone is cleared. The hole 15 in the top of the socket is for the purpose of reaching the ball with the stem of a depth micrometer to measure from the cone front face. The open end 16 of the socket 8 is closed by a washer 10, shown in Figs. 4 and 5, the inside diameter of which is arranged to slip-fit on the spindle 6 or anvil 7 of the micrometer 2, leaving it free to turn. Of course, socket 8 can be made so as not to require a washer when the diameter of ball 9 is equal to or less than the diameter of the spindle or anvil. The outside diameter of the washer fits tightly within open end 16 of the socket 8.

This invention has several variations, one of which is disclosed in Figs. 6, 7, and 8. Fig. 6 discloses in an assembled relation this modified type of socket similar to the construction hereinbefore described but used when the balls required are smaller in diameter than the diameters of the spindle and anvil of the micrometer. Figs. 7 and 8 show this socket in detail. In this variation, washer 17, shown in Fig. 9, is inserted within the socket in the place provided therefor to prevent rearward movement of ball 9. The spring 18, shown in Fig. 10, fits within the hollow piece for the purpose of providing more friction between the spindle and attachment if such becomes necessary on some sizes.

Another socket variation is shown in Figs. 11 and 12 in which two arms 19 with tapered faces 20 extend from the hollow piece 21 to form the socket for the ball 9. This particular variation allows maximum exposure of the ball in the measuring plane.

Any form of this attachment is assembled onto the spindle and/or the anvil of a micrometer, making it possible to turn the spindle of the micrometer without disturbing the relation between the work piece and the attachments. A very short space is required for the attachment, and hence the micrometer can be used almost to maximum span.

In checking a measurement over an irregular surface, the attachment is placed over the spindle 6 and anvil 7 of the micrometer 2 so that the flat end surface of the spindle 6 and anvil 7 is tangent to the surface of the ball 9 forming part of the attachment. The micrometer 2 with the attachment is then placed on the work 1 so that the surface of the ball 9 tangent to the anvil 7 contacts the surface 14 of the work. The measurement is then made by rotating the ratchet knob 4 so that the ball 9, which is tangent to the spindle 6, approaches the work. When this ball contacts the work with the proper tightness, the ratchet slips and the spindle cannot be further rotated by turning the ratchet knob 4. The measurer then reads the measurement on the scale of the micrometer in the usual manner, and makes compensation for the diameter of the balls if the micrometer has not been zeroed to automatically compensate for them. Where one surface is plain, only one attachment need be used.

Obviously, the hereinbefore described attachment with some of its variations still admits of considerable modification without departing from the invention, and, of course, the attachment can be used on internal as well as external micrometers. Therefore, I do not wish to be limited to the precise arrangements shown and described.

What I claim is:

1. A spindle or anvil attachment for a micrometer comprising a hollow piece having connected holding arms, said arms each having an outer face sloping inwardly toward said spindle or anvil, a closure washer within said hollow piece and forming therewith a socket, said closure washer having an internal bore therein substantially equal in diameter to said spindle or anvil, and a ball within said socket, said hollow piece having a hole therein whose axis is transverse to the axis of the spindle or anvil and displaced from the end thereof a distance equal to the radius of said ball.

2. A spindle or anvil attachment for a micrometer comprising a hollow piece having connected holding arms, said arms each having an outer face sloping inwardly toward said spindle or anvil, a closure washer within said hollow piece and forming therewith a socket, said closure washer having an internal bore therein substantially equal in diameter to said spindle or anvil, and a ball within said socket.

3. A spindle or anvil attachment for a micrometer comprising a hollow piece having connected holding arms thereon with an opening therebetween, said arms each having an outer face sloping inwardly toward said spindle or anvil, a closure washer within said hollow piece and forming therewith a socket, said closure washer having an internal bore therein substantially equal in diameter to said spindle or anvil, and a ball within said socket, said hollow piece having a hole therein whose axis is transverse to the axis of the spindle or anvil and displaced from the end thereof a distance equal to the radius of said ball.

4. A spindle or anvil attachment for a micrometer comprising a hollow piece having holding arms, said arms allowing a maximum of surface of the ball held therein to protrude, and a closure washer within said hollow piece, said closure washer having an internal bore therein substantially equal in diameter to said spindle or anvil.

5. A spindle or anvil attachment for a micrometer comprising a hollow piece having holding arms, said holding arms each having an outer face sloping inwardly toward said spindle or anvil, a ball within said arms, and a closure washer within said hollow piece, said closure washer having an internal bore therein substantially equal in diameter to said spindle or anvil.

6. A spindle or anvil attachment for a micrometer comprising a hollow piece having connected holding arms, said arms each having an outer face sloping inwardly toward said spindle or anvil, a ball within said hollow piece, an opening between said arms allowing the surface of the ball to protrude, said hollow piece having a hole therein whose axis is transverse to the axis of the spindle or anvil and displaced from the end thereof a distance equal to the radius of said ball.

7. A spindle or anvil attachment for a micrometer comprising a hollow piece having connected holding arms, said holding arms each having an outer face sloping inwardly toward said spindle or anvil, a ball within said hollow piece, an opening between said arms allowing the surface of the ball to protrude, said hollow piece having a hole therein whose axis is transverse to the axis of the spindle or anvil and displaced from the end thereof a distance equal to the radius of said ball, a large counterbore within said hollow piece, and a closure washer fitting tightly within said counterbore, said closure washer having an internal bore therein substantially equal in diameter to said spindle or anvil.

8. A spindle or anvil attachment for a micrometer comprising a hollow piece having connected holding arms, said holding arms each having an outer face sloping inwardly toward said spindle or anvil, a ball within said hollow piece, an opening between said arms allowing the surface of the ball to protrude, a washer forming the rear closure of the socket, a large counterbore within said hollow piece, and a spring within said counterbore.

9. A spindle or anvil attachment for a micrometer comprising a body having a hollow portion therein, said body having a bore therein to receive said spindle or anvil, said body having holding arms thereon with an opening therebetween, a ball in said hollow portion resting between said anvil or spindle and said holding arms, said ball projecting through said opening between said holding arms, said holding arms having outer faces sloping toward said hollow portion, said ball being exposed throughout more than 90° of its circumference below the axis of said spindle or anvil and in a plane parallel thereto, said hollow portion having a hole therein whose axis is transverse to the axis of the spindle or anvil and is displaced from the end thereof a distance equal to the radius of said ball.

PAUL M. ZUMSTEIN.

REFERENCES CITED

The following references are of record in the file of this patent:

UNITED STATES PATENTS

| Number | Name | Date |
|---|---|---|
| 639,560 | Hanson | Dec. 19, 1899 |
| 1,540,473 | Hitchcock | June 2, 1925 |
| 1,910,467 | Heckersdorf et al. | May 23, 1933 |
| 1,921,899 | Webbking | Aug. 8, 1933 |